United States Patent [19]

Onizuka et al.

[11] Patent Number: 4,955,586
[45] Date of Patent: Sep. 11, 1990

[54] APPARATUS FOR TREATING SLURRY BY GAS-LIQUID CONTACT METHOD

[75] Inventors: Masakazu Onizuka; Atsushi Tatani, both of Hiroshima, Japan

[73] Assignee: Mitsubishi Jukogyo Kabushiki Kaisha, Tokyo, Japan

[21] Appl. No.: 329,430

[22] Filed: Mar. 28, 1989

[30] Foreign Application Priority Data

Apr. 8, 1988 [JP] Japan .................................. 63-85324

[51] Int. Cl.⁵ .............................................. B01F 3/04
[52] U.S. Cl. ...................................................... 261/87
[58] Field of Search ........................................... 261/87

[56] References Cited

U.S. PATENT DOCUMENTS

| | | | |
|---|---|---|---|
| 1,579,355 | 4/1926 | Greenawalt | 261/87 |
| 3,400,051 | 9/1968 | Hofschneider | 261/87 |
| 3,414,245 | 12/1968 | Frazer | 261/87 |
| 3,482,520 | 12/1969 | Larsen | 261/87 |
| 3,630,498 | 12/1971 | Bielinski | 261/87 |
| 3,677,528 | 7/1972 | Martin | 261/87 |
| 4,818,445 | 4/1989 | Onizuka et al. | 261/87 |

FOREIGN PATENT DOCUMENTS

| | | | |
|---|---|---|---|
| 961795 | 4/1957 | Fed. Rep. of Germany | 261/87 |
| 1189522 | 3/1965 | Fed. Rep. of Germany | 261/87 |
| 2218134 | 9/1974 | France | 261/87 |
| 50-17318 | 6/1975 | Japan . | |
| 104637 | 8/1980 | Japan | 261/87 |
| 61-150047 | 9/1986 | Japan . | |

Primary Examiner—Tim Miles
Attorney, Agent, or Firm—Toren, McGeady & Associates

[57] ABSTRACT

An apparatus for treating a slurry by gas-liquid contact, said apparatus comprising a hollow rotary shaft, stirring rods fixed to the lower end of said shaft, and gas supply pipes to supply a gas to the negative-pressure region which is formed behind the stirring rods as they rotate, said gas supply pipes having their openings fixed to the back of said stirring rods, and said stirring rod being provided on the top thereof with a plate to stabilize the negative-pressure region, said plate extending in the direction opposite to the rotating direction of the stirring rod.

2 Claims, 3 Drawing Sheets

APPARATUS FOR TREATING SLURRY BY GAS-LIQUID CONTACT METHOD

FIELD OF THE INVENTION AND RELATED ART STATEMENTS

The present invention relates to an apparatus for treating a slurry by the gas-liquid contact method or by blowing a gas into the slurry. The apparatus of the present invention can be applied to the step of oxidizing sulfites in the apparatus for flue gas desulfurization based on the wet lime-gypsum process.

The unit for wet flue gas desulfurization is provided with an apparatus for oxidizing sulfites formed by the reaction. There are two methods of oxidation by this apparatus. One method involves the air blowing and agitation which promote the gas-liquid contact. Air blowing is accomplished by means of the blowing pipe having a large number of blow holes which is arranged on the bottom of the absorbing liquid tank, and agitation is accomplished by rotary mixing blades arranged over the blowing pipe. The other method involves the gas blowing and the division of bubbles into smaller bubbles. They are accomplished by means of rotary mixing blades and a large number of gas blow holes arranged thereon.

A disadvantage of the former method is that the blow holes should have a small diameter and the number of the blow holes should be great because most of the gas discharged from the blow holes forms bubbles of a comparatively large diameter and such bubbles are not easily divided into smaller bubbles by the rotary mixing blades.

By contrast, the latter method is designed to blow a gas from the means attached to the agitator, thereby to uniformly disperse the gas into the liquid. Therefore, it is advantageous over the former method in that it works with a simple apparatus and provides a good gas-liquid contact efficiency.

The apparatus used for the latter method is schematically shown in FIG. 4. (Refer to Japanese Utility Model Provisional Publication No. 61-150047/1986.) There is shown a liquid storage tank 6 which holds a liquid 10 to be treated. There is also shown a hollow rotary shaft 3 provided with a hollow stirring rod 21 having a large number of gas blow holes 20. The stirring rod 21 is revolve by an electric motor 9. A gas 11 is introduced into the hollow rotary shaft 3 and the hollow stirring rod 21 and finally blown out from the blow holes 20. This apparatus can produce minute bubbles because the hollow stirring rod 21 supplies a gas as it moves, forming a gas zone behind it, which gradually scatters into small bubbles.

OBJECT AND SUMMARY OF THE INVENTION

The conventional apparatus as shown in FIG. 4 can improve the gas-liquid contact efficiency because it produces minute bubbles by means of the hollow stirring rod which forms a gas zone behind it as it rotates, which gradually scatters into small bubbles.

This apparatus, however, does not function satisfactorily when applied to the treatment of a slurry by gas-liquid contact, because the blow holes inevitably permit slurry splashes to enter the hollow stirring rod. Slurry splashes build up into scale surrounding the individual blow holes and finally clog them. This apparatus has an additional disadvantage that when the gas supply is suspended, a slurry enters the hollow stirring rod, forming scale therein. The scale causes the gas being blown from the stirring rod to vary in flow rate from one stirring rod to another. The varied flow rate causes the stirring rod to vibrate, interrupting the revolution.

FIG. 5 schematically shows the scale which has built up in the stirring rod. There is shown hard scale 22 which has built up on the inner wall of the stirring rod 21 opposite to the gas blow hole 20. This scale is too hard to be washed out by water. Hard scale also clogs some of the blow holes 20'. There is shown a mixed accumulation 23 of hard scale and soft scale on the inner wall of the stirring rod between blow holes 20 and at the end of the stirring rod.

It is an object of the present invention to provide a new apparatus which is free of the above-mentioned disadvantages and is capable of treating a slurry by gas-liquid contact at a high efficiency over a long period of time without causing the trouble resulting from scale accumulation in the stirring rod.

The gist of the present invention resides in an apparatus for treating a slurry by gas-liquid contact, said apparatus comprising a hollow rotary shaft, stirring rods fixed to the lower end of said shaft, and gas supply pipes to supply a gas to the negative-pressure region which is formed behind the stirring rods as they rotate, said gas supply pipes having their openings fixed to the back of said stirring rods, and said stirring rod being provided on the top thereof with a plate to stabilize the negative-pressure region, said plate extending in the direction opposite to the rotating direction of the stirring rod.

According to the present invention, the apparatus for treating a slurry by gas-liquid contact further comprises a splash guard plate mounted under the opening of the gas supply pipe.

The apparatus of the present invention achieves high gas-liquid contact efficiencies in the treatment of a slurry owing to the negative pressure stabilizing plate which is attached to the top of the stirring rod and extends in the direction opposite to the rotating direction of the stirring rod. This plate helps a negative pressure region to be formed behind the stirring rod as it rotates. The negative-pressure region permits a gas to enter it and become minute bubbles which disperse into the slurry. In addition, the apparatus of the present invention permits the stable treatment of a slurry over a long period of time because it has no hollow stirring rods and blow holes which are subject to clogging.

The apparatus of the present invention is additionally provided with a splash guard plate under the opening of the gas supply pipe. This guard plate prevents slurry splash from entering the opening of the gas supply pipe, thereby preventing the accumulation of scale.

BRIEF DESCRIPTION OF THE DRAWINGS

FIG. 2 is a perspective view showing the important parts of the apparatus shown in FIG. 1.

FIG. 3 is a sectional view taken in the direction of the arrows along the line A—A of FIG. 2.

DETAILED DESCRIPTION OF PREFERRED EMBODIMENTS

Figure 1:
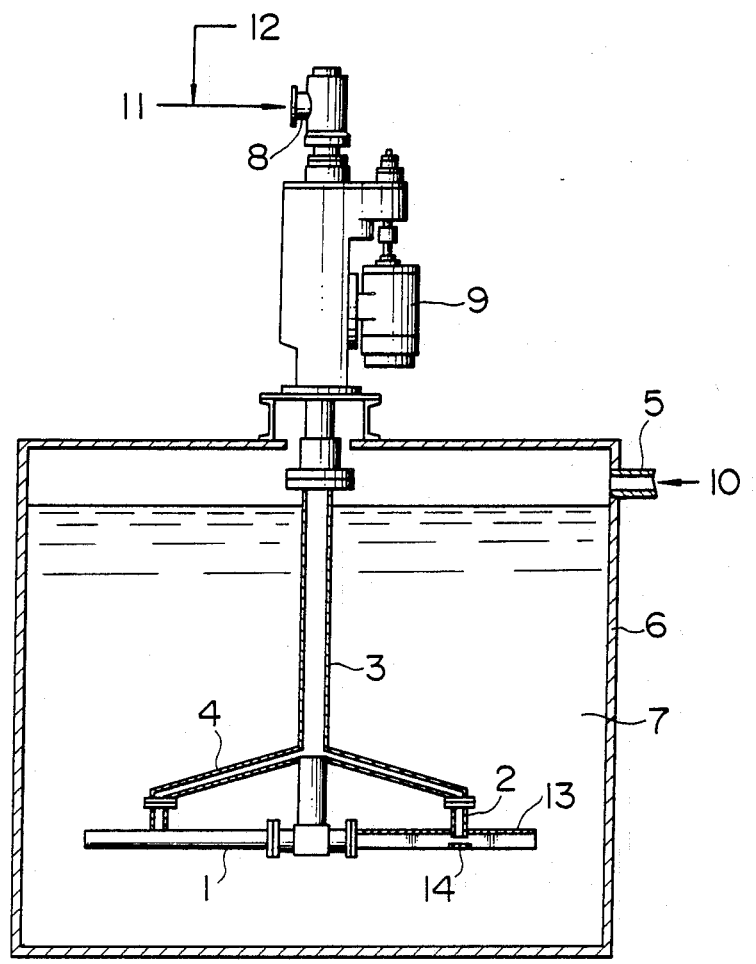
FIG. 1 is a schematic drawing showing an apparatus for treating a slurry by gas-liquid contact method, said apparatus pertaining to an embodiment of the present invention.

The present invention will be described in more detail with reference to an embodiment shown in FIGS. 1 to 3.

The apparatus for treating a slurry by gas-liquid contact is made up of a liquid storage tank 6 holding a slurry 7, a vertical hollow rotary shaft 3 having a gas inlet 8 at its upper part, and a plurality of horizontal stirring rods 1 attached to the lower end of the rotary shaft 3. The horizontal stirring rod has a semicircular cross-section, with the arc projecting in the rotating direction. The stirring rod 1 is provided on its top with a negative-pressure region stabilizing plate 13 which extends in the direction opposite to the rotating direction of the stirring rod 1 and also extends from the forward end of the stirring rod 1 to the center of rotation.

The hollow rotary shaft 3 is provided with connecting pipes 4 which are inclined downward. To the lower end of the connecting pipe 4 is connected a gas supply pipe 2 which pierces the stabilizing plate 13. This arrangement permits a gas 11 to enter the gas inlet 8, pass through the hollow rotary shaft 3 and the connecting pipe 4, and blow off from the opening 2' of the gas supply pipe 2.

The hollow rotary shaft 3 is revolved by the electric motor 9 mounted above the liquid storage tank 6, and hence the stirring rods 1 are turned by the hollow rotary shaft 3. The stirring rod 1 is provided at its lower part with a splash guard plate 14 which extends, under the opening 2' of the gas supply pipe 2, in the direction opposite to the rotating direction of the stirring rod 1. Incidentally, the liquid storage tank 6 is provided at its upper part an inlet 5 for feed slurry 10.

When the apparatus is in operation, the stirring rod 1 generates a negative pressure behind it as it rotates and the negative pressure permits a void to be formed by a gas 11 blown out from the opening 2' of the gas supply pipe 2. At the rear end of the void, the gas 11 scatters into minute bubbles which disperse into the slurry. The splash guard plate 14 mounted under the opening 2' of the gas supply pipe 2 prevents the slurry from being splashed by the gas 11 blown out downward from the opening 2' of the gas supply pipe 2.

Figures 2, 3:
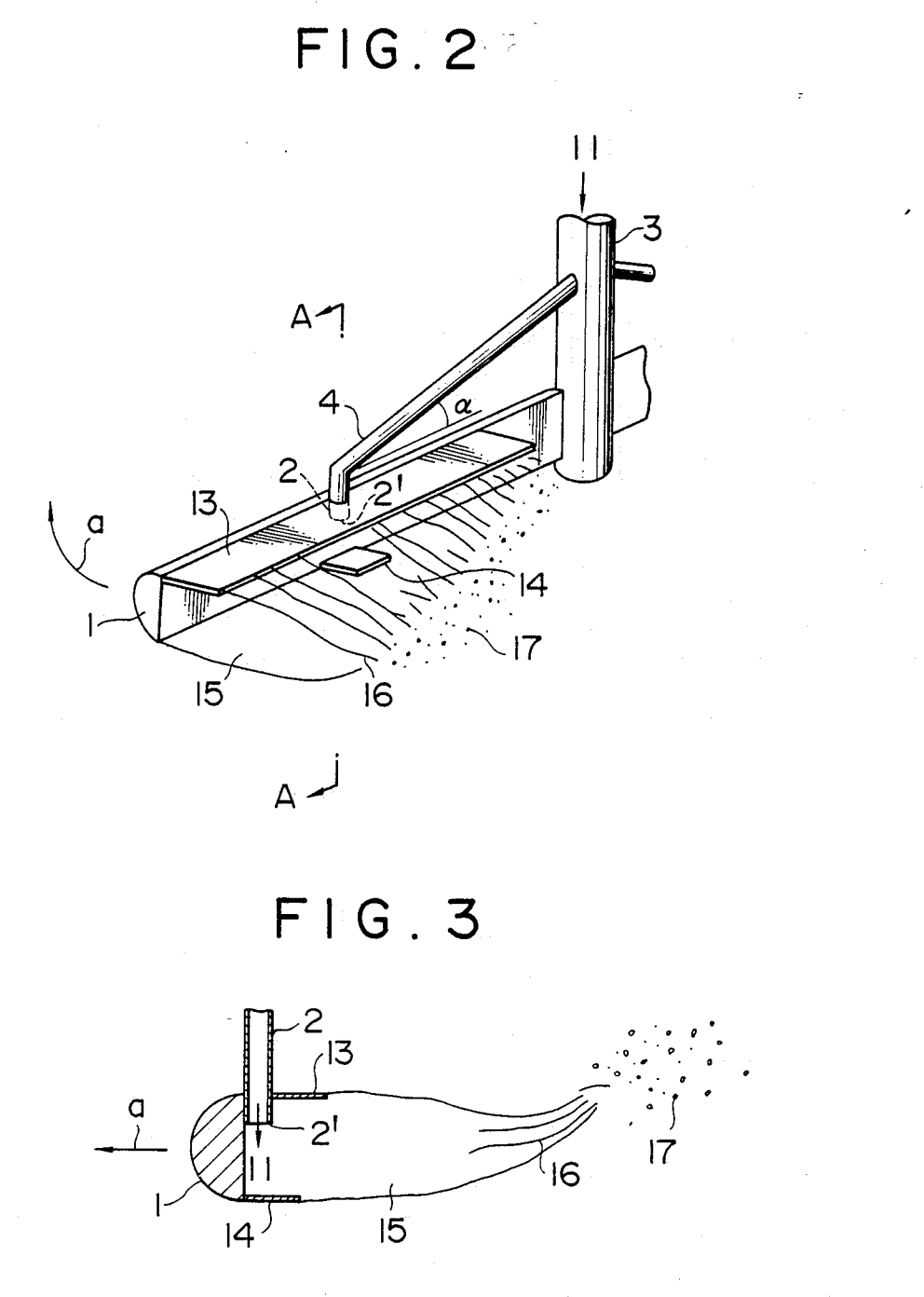

FIGS. 2 and 3 illustrate how minute bubbles are formed in the embodiment of the present invention. When the stirring rod 1 is revolved in the direction of the arrow a at a speed of 50–150 rpm, while the gas 11 is being blown out from the lower opening 2' of the gas supply pipe 2, the stirring rod 1 forms a void 15 (negative-pressure region) behind it. This void extends almost all over the entire length of the stirring rod 1. The void remains stable, forming a tail 16, owing to the stabilizing plate 13 provided on the top of the stirring rod. At the tail 16 of the void 15, the gas 11 scatters into minute bubbles 17 which disperse into the slurry. The tail 16 becomes shorter (coming close to the stirring rod 1) as it gets nearer the revolving center. In other words, the void 15 shown in section taken along the line A—A of FIG. 2 becomes shorter as it gets nearer the revolving center. For this reason, the gas supply pipe 2 should be attached to the stabilizing plate 13 at a position a certain distance away from the rotary shaft.

While the stirring rod 1 is rotating, the gas 11 blown out from the opening 2' of the gas supply pipe 2 hits the splash guard plate 14 and then spreads throughout the void 15. This arrangement prevents splash from entering the gas supply pipe 2. When the apparatus is out of operation, the back flow of the slurry into the connecting pipe 4 and the rotary hollow shaft 3 through the opening 2' of the gas supply pipe 2 is prevented because the connecting pipe 4 is inclined downward. For this purpose, the angle ($\alpha$) of inclination for the connecting pipe 4 should preferably be about 15 degrees. When the operation is resumed, the rotary hollow shaft 3 and connecting pipe 4 are readily cleared of solids by supplying the gas 11 together with the washing water 12.

As mentioned above, in order to form the void 15 smoothly, the stirring rod 1 is provided at the top thereof with the stabilizing plate 13 which extends from the end thereof toward the revolving center thereof. However, it is not always necessary that the stabilizing plate 13 should extend over the entire length of the stirring rod 1, because it is difficult to mount the stabilizing plate 13 in the close vicinity of the rotary hollow shaft 3 and yet the void 15 behind the stirring rod 1 is rather small and the effect of the stabilizing plate 13 is not so great there.

The above-mentioned embodiment produces the following effects. The stirring rod 1 forms stable void 15 behind it and along the length thereof as it rotates because it is provided on the top thereof with the negative-pressure stabilizing plate 13 which extends in the direction opposite to the rotating direction thereof. The gas supplied to this void 15 through the gas supply pipe 2 spreads throughout the void along the length of the stirring rod 1 and then scatters into minute bubbles 17 at the tail 16 of the void. The minute bubbles 17 disperse in the slurry.

The above-mentioned embodiment also produces the following effect. The splash guard plate 14 attached to the stirring rod 1 under the opening of the gas supply pipe 2 prevents the slurry from being splashed by the gas blown out from the gas supply pipe 2.

Incidentally, the stirring rod 1 in the abovementioned embodiment has a semicircular cross-section, with the arc projecting in the rotating direction, as shown in FIG. 3. However, the cross-section is not limited in the present invention. The stirring rod 1 may have a cross-section of any shape so long as it forms the void 15 behind it as it rotates as mentioned above. Working Example An apparatus as shown in FIG. 1, with the liquid storage tank 6 measuring 6 m wide and 4 m deep and the level being 4 m high, was constructed. Using this apparatus, experiments were carried out to blow air into the absorbing liquid containing calcium sulfite formed in a wet desulfurization unit, thereby oxidizing calcium sulfite into gypsum.

The stirring rod 1 was formed by cutting half a pipe 1150 mm long and 60.5 mm in outside diameter, with the section and ends closed with a flat plate. Four units of rotary hollow shaft 3, 150 mm in diameter. The stabilizing plate 13 extending from the end toward the rotating center is 1000 mm long, 120 mm wide, and 3 mm thick. Each stirring rod 1 was provided with one gas supply pipe 2, 22.7 mm in diameter. The gas supply pipe 2 was passed through the stabilizing plate 13 so that the opening 2' thereof extends 10 mm downward from the stabilizing plate 13. (The piercing part was welded.) The splash guard plate 14, 80 mm square and 3 mm thick, was attached to the rear lower part of the stirring rod 1 immediately under the opening of the gas supply pipe 2.

The apparatus was run continuously for about one month while keeping the slurry temperature at about 50° C. and the slurry concentration at 17 wt % (as gypsum), by supplying sulfite at a rate of 3.5 kg-mol/h and air at a rate of 400 Nm$^3$/h and rotating the stirring rods at 60 rpm. During operation, the oxidation of the sulfite was 100%. After one month's operation, the liquid storage tank was emptied for inspection. No scale was found in the gas blow pipe.

COMPARATIVE EXAMPLE

Figure 4:
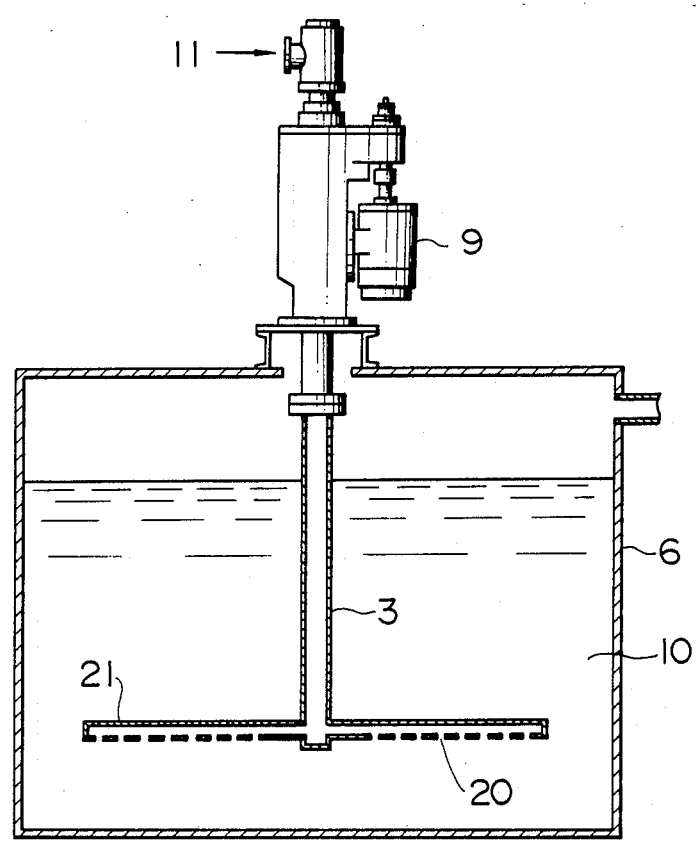
FIG. 4 is a schematic drawing showing a conventional gas-liquid contact apparatus.

The same experiment as in Working Example was conducted using the apparatus shown in FIG. 4. This apparatus has stirring rods which are round pipes 1150 m long,. 60.5 mm in outside diameter and 52.7 mm in inside diameter. Each stirring rod has 8 blow holes, 8 mm in diameter, which open downward.

Figure 5:
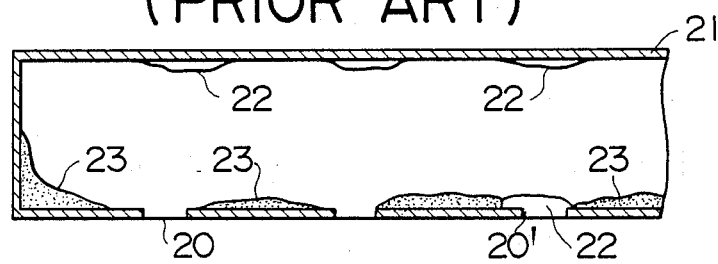
FIG. 5 is a schematic representation showing the scale accumulation in the hollow stirring rod that takes place when the apparatus shown in FIG. 4 is used.

After operation for about 50 hours, the apparatus was shut down on account of vibration. In this period, the oxidation of sulfite was 100%. The liquid storage tank was emptied for inspection. Soft scale and hard scale were found in the stirring rod as shown in FIG. 5. Two to four blow holes on each stirring rod were found clogged with hard scale, and the accumulation of soft scale was found on the internal wall above the blow hole. This is considered to have occurred due to splashing caused by air blowing.

The above-mentioned examples demonstrate that the apparatus pertaining to the present invention prevents the scale accumulation and permits the slurry treatment by gas-liquid contact in a stable manner over a long period of time.

The present invention produces the following effects. The stirring rod forms a stable void (negative pressure region) behind it as it rotates owing to the stabilizing plate. The void helps the gas to disperse into the slurry. In addition, the splash guard plate prevents the slurry from being splashed by the blown air from the gas supply pipe. This construction makes it possible to carry out the gas-liquid contact treatment efficiently and stably over a long period of time.

We claim:

1. An apparatus for treating a slurry by gas-liquid contact, said apparatus comprising a hollow rotary shaft, stirring rods fixed to the lower end of said shaft, and gas supply pipes to supply a gas to the negative-pressure region which is formed behind the stirring rods as they rotate, said gas supply pipes having their openings fixed to the back of said stirring rods, and at least one of said stirring rods being provided on the top thereof with a plate to stabilize the negative-pressure region, said plate extending in the direction opposite to the rotating direction of the stirring rod.

2. An apparatus according to claim 1, which further comprises a splash guard plate mounted under the opening of the gas supply pipe.

* * * * *